United States Patent Office.

WILLIAM P. McCONNELL, OF WASHINGTON, DISTRICT OF COLUMBIA.

Letters Patent No. 114,175, dated April 25, 1871.

IMPROVEMENT IN EXTRACTING METALS FROM ORES.

The Schedule referred to in these Letters Patent and making part of the same.

Be it known that I, WILLIAM P. McCONNELL, of Washington city and county, and in the District of Columbia, have invented or discovered a certain new and useful process for Separating Gold, Silver, and Copper from their original Ores or Quartz; and I do hereby declare that the following is a full, clear, and exact description thereof.

The nature of my invention or discovery consists in the use of potash or potassi in combination with unslaked lime and common salt to constitute a flux to be mixed in certain proportions, and to be used with the mineral ores or quartz herein named, in the proportion and manner and for the purposes herein described.

My flux is composed of equal parts of potash or any of its well-known equivalents, unslaked lime, and common salt, which is to be mixed with the ore or quartz, broken into egg size, in the proportion of about one (1) of flux to about five (5) of ore or quartz.

The flux and ore having been thus prepared a common cupola-furnace, such as is used in melting iron in foundries, the blower introducing the blast at the side and near the bottom of the furnace, and provided with an isinglass window, through which the contents are watched to see when the mass is sufficiently melted; such a furnace is charged.

In a very short time a sufficient degree of heat is generated out of the charcoal or anthracite, which is used in the usual manner, as to cause the mass of ore to melt.

The mass of ore being sufficiently melted the charge is drawn off as iron is ordinarily drawn off, and run into a casting of a convenient size, having a conical cavity as a mold for the charge.

This casting is, previous to running the charge into it, heated enough so that when the melted metal runs into it it cannot chill until the whole charge has run in and settled.

While the charge is running in I assist the precipitation by striking on the edge of the casting with a stick or mallet.

When the mass is sufficiently cool it is turned out of the casting, and the metal, from its greater gravity, will be found to have gathered at the bottom of the mold, and is then readily removed from the ore.

I use a chimney with two elbows, in connection with the cupola pointing downward, reaching to within two feet of the ground, with the lower end in a tub or vessel one-half full of water, in which to catch the fine gold that will not precipitate; the end of the chimney to come within about a foot of the surface of the water.

When there are two or three of the metals which my discovery is intended to be used with ore contained in the same charge, previous to drawing the charge off I place within the casting containing the mold in which the charge is to be run a portion of sulphur in proportion to the amount of metal that it is calculated will be produced by the ore, and the effect of the sulphur is to separate the metals so that the metal of greatest gravity will be precipitated to the bottom, the metal of the next greatest gravity will be above the metal of greatest gravity, and the metal of least gravity will be next to the ore; the masses of different gravities are separate and readily freed from contact with one another by blows from a hammer when they have cooled.

In the case of ores that have to be desulphurized, and that are not sufficiently valuable to be smelted, but which may be rubbed or ground and the metal so separated, my flux and process can be used very effectively. To use my process for this purpose of desulphurizing, the only difference being I do not heat the charge sufficiently to melt it.

Having thus fully described my invention,

What I claim as new, and desire to secure by Letters Patent, is—

1. A combination of potash, or its equivalent, unslaked lime, and common salt, in about equal proportions, as a flux for the purposes described, and operating as set forth.

2. The process described of separating metals of different specific gravity by pouring them into a conical mold with a flux of sulphur, substantially as described.

WM. P. McCONNELL.

Witnesses:
T. G. CLAYTON,
V. C. CLAYTON.